United States Patent [19]

Mounier

[11] 3,759,936

[45] Sept. 18, 1973

[54] OXIDATION OF O-TOLUENESULFONAMIDES BY MOLECULAR OXYGEN

[75] Inventor: Paulin Mounier, Rhone, France

[73] Assignee: Rhone-Poulenc S.A., Paris, France

[22] Filed: Mar. 31, 1971

[21] Appl. No.: 129,976

[30] Foreign Application Priority Data
Apr. 1, 1970 France ............................... 7011659
Nov. 16, 1970 France ............................... 7040970

[52] U.S. Cl. .............................................. 260/301
[51] Int. Cl. .............................................. C07d 91/08
[58] Field of Search ............................. 260/301, 687

[56] References Cited
UNITED STATES PATENTS
319,082  6/1885  Fahlberg ............................ 260/301

1,507,565  9/1924  Altwegg et al. ..................... 260/301

*Primary Examiner*—Richard J. Gallagher
*Attorney*—Stevens, Davis, Miller & Mosher

[57] ABSTRACT

Compounds containing a 1,2-benzisothiazolidin-3-one-1,1-dioxide group, notably saccharin are prepared by a 1 step oxidation of an ortho-toluenesulphonamide compound with molecular oxygen in the liquid phase in the presence of a metal oxidation catalyst e.g., a manganese or cobalt salt. The oxidation is preferably carried out in aqueous acetic acid using carbonyl compound as oxidation initiator.

8 Claims, No Drawings

OXIDATION OF O-TOLUENESULFONAMIDES BY MOLECULAR OXYGEN

The present invention relates to a process for the preparation of compounds containing at least one 1,2-benzisothiazolidin-3-one-1,1-dioxide group, commonly called ortho-sulphobenzimide group. It relates, in particular, to the preparation of saccharin and its homologues, which are used in various fields such as the foodstuff industry, plastics, and the galvanoplasty.

Saccharin and its homologues have been prepared by various methods, of which the most frequently used comprised oxidising o-toluenesulphonamide or a homologue thereof to give an o-sulphonamidobenzoic acid, which was subsequently dehydrated to give the desired o-sulphobenzimide. The oxidation of o-toluenesulphonamide can be effected chemically or electrolytically, oxidation with a sulphuric acid/chromic acid mixture being most commonly employed. Such oxidation methods require the use of large amounts of inorganic compounds, which makes the oxidation process costly. Furthermore, the presence of residual inorganic products in the reaction mixture implies a frequently lengthy process for isolating saccharin of a high degree of purity. THORPE'S DICTIONARY — 4th edition — volume X, page 647, summarises the various processes used to manufacture saccharin and its homologues.

A process has now been discovered which makes it possible to prepare ortho-sulphobenzimides from ortho-toluenesulphonamides in a single step, and to do so with good yields and without requiring subsequent purification.

The present invention provides a process for the preparation of an aromatic compound containing at least one ortho-sulphobenzimide group, by oxidation of an aromatic compound containing at least one ortho-toluenesulphonamide group, by means of air or molecular oxygen, in the liquid phase in the presence of an oxidation catalyst capable of converting an alkylaromatic hydrocarbon into an acid by oxidation with air.

The present invention is particularly applicable to the preparation of saccharin and its homologues by oxidation of the corresponding ortho-toluenesulphonamides by air.

The reaction, which takes place in a single step, can be represented generically as follows:

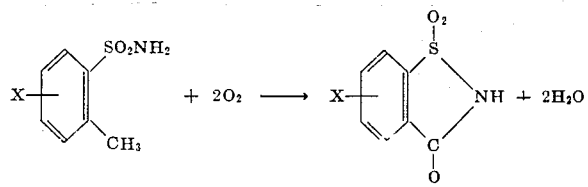

In this formula X represents hydrogen or a group which is inert under the reaction conditions, for example a halogen atom or a nitro or amino group. The compound to be oxidised may contain several sulphonamide groups, each in an ortho position relative to an alkyl radical; compounds containing several o-sulphoimide groups are then obtained.

The oxidising agent can be air or molecular oxygen by itself or mixed with an inert gas. The reaction is preferably carried out in a liquid organic diluent which acts as an inert solvent under the reaction conditions but in which the desired ortho-sulphobenzimide is substantially completely insoluble in the cold. This enables the product to be isolated directly. Acetic acid or propionic acid are very suitable organic diluents for this purpose.

The yield is generally improved by adding a little water to the organic diluent. The proportion of water used in this way can be as much as 8 percent of the weight of the diluent. One of the most suitable diluents for use in the process is a lower fatty acid such as acetic acid, containing 1 to 8 percent, preferably 2 to 6 percent, of water relative to the weight of acid.

The catalyst used is one of the metal compounds customarily used for air oxidation of alkyl-aromatic hydrocarbons to the corresponding acids; manganese salts or cobalt salts of organic acids, or metal halides, by themselves or as mixtures, are particularly suitable. The presence of an oxidation initiator such as an aldehyde or a ketone favours the start of the reaction and acetaldehyde, butyraldehyde, acetone and methyl ethyl ketone are very suitable for this purpose. However, this presence of an initiator is not essential; in their absence, the reaction is sometimes slower at the start but a judicious choice of the temperature and pressure allows the oxidation to be carried out successfully. This choice of the temperature and pressure is guided by the fact that the reaction must be effected in the liquid phase.

When the reaction is over, the ortho-sulphobenzimide crystallises on cooling and may be isolated directly to obtain the product in a pure state.

The Examples which follow illustrate the invention.

EXAMPLE 1

900 g. of acetic acid, 2.3 g. of cobalt bromide dihydrate, 0.3 g. of manganese bromide tetrahydrate and 42.7 g. of o-toluenesulphonamide are introduced into a stirred autoclave of 3.6 l. capacity. The mixture is heated to 140° C. under an air pressure of 15 bars, whilst flushing with 300 l. of air per hour. A 5 percent strength solution of acetaldehyde in acetic acid is then continuously introduced into the autoclave at the rate of 100 g. per hour, for 4 hours 30 minutes.

The mixture is cooled to 100° C., the pressure is released, 100 cm³ of water are then added to the reaction mixture, and the latter is demineralised by passing it over a cation exchange resin. The resulting solution is concentrated by distillation (under a reduced pressure of 50 mm. of mercury) until crystallisation starts. Crystallisation is allowed to take place at ambient temperature, and the precipitate is filtered off, washed with 40 cm³ of acetic acid, and dried at 100° C.

24.4 g. of white saccharin crystals of melting point 226° C. (KOFLER) and acid number 303 (theory 306) are obtained. The yield is 53.4 percent.

EXAMPLE 2

Example 1 is repeated, replacing the acetaldehyde by methyl ethyl ketone, which is introduced into the autoclave in the same manner, that is to say as a 5 percent strength solution in acetic acid at the rate of 100 g. per hour, and for a period of 3 hours. After cooling the reaction mixture, 23 g. of pure saccharin are isolated. Yield 50 percent.

EXAMPLE 3

Example 1 is repeated replacing the o-toluenesulphonamide by 43.2 g. of 2-methyl-5-nitrobenzenesulphonamide. The reaction is stopped after 7 hours and the reaction mixture is cooled, then treated with 300 cm³ of water, passed over a cation exchange resin, and then concentrated in vacuo and allowed to crystallise. Two successive recrystallisations give 30.25 g. of 5-nitro-saccharin, a light yellow powder of melting point 207° C. (KOFLER) and acid number 251. Yield 66 percent.

EXAMPLE 4

500 g. of acetic acid, 20 g. of cobalt acetate tetrahydrate, 10 g. of acetaldehyde and 42.7 g. of o-toluenesulphonamide are introduced into an autoclave of 3.6 litres capacity. The mixture is heated to 120° C., whilst stirring, under a pressure of 15 bars, which is maintained by means of a stream of air of 300 litres/hour. After half an hour, a 10 percent by weight solution of acetaldehyde in acetic acid is continuously injected at the rate of 100 g. per hour. After a further 2 hours, the reaction is stopped, the mixture is allowed to cool, the gas is released, and the reaction mixture is worked up as described in Example 1 to give 18.4 g. of pure saccharin, yield 40 percent.

EXAMPLE 5

880 g. of acetic acid, 2.3 g. of cobalt bromide dihydrate, 0.3 g. of manganese bromide tetrahydrate, 42.7 g. of o-toluenesulphonamide and 20 g. of water are introduced into a stirred autoclave of 3.6 l. capacity. The mixture is heated to 140° C. under an air pressure of 15 bars whilst flushing with 300 l. of air per hour. A 5 percent solution of acetaldehyde in acetic acid is then continuously introduced into the autoclave at the rate of 100 g. per hour for 4 hours.

The mixture is then cooled to 100° C., the pressure released, 100 cm³ of water added to the reaction mixture and the latter is demineralised by passing it over a cation exchange resin. The solution obtained is concentrated by distillation (under a reduced pressure of 50 mm. of mercury) until crystallisation starts. Crystallisation is allowed to take place at ambient temperature, and the precipitate is filtered off, washed with 40 cm³ of acetic acid and dried at 100° C.

32.8 g. of white saccharin crystals of melting point 228°–229° C. (KOFLER) and acid number 308 (theory 306) are obtained. The yield is 71.7 percent.

EXAMPLE 6

Example 5 is repeated but the reaction is carried out in 860 g. of acetic acid and in the presence of 40 g. of water. 33.3 g. of saccharin of melting point 229° C. and acid number 308 are obtained. The yield is 72.8 percent.

I claim:

1. Process for the preparation of an aromatic compound containing at least one orthosulphobenzimide group, by oxidation of an aromatic compound containing at least one ortho-toluenesulphonamide group, by contacting the aromatic compound containing at least one ortho-toluenesulphonamide group with air or molecular oxygen, in the liquid phase in the presence of an acetate or halide of manganese or of cobalt.

2. Process according to claim 1, in which the oxidation is carried out in a liquid organic diluent which is an inert solvent under the reaction conditions, but in which the ortho-sulphobenzimide compound is substantially completely insoluble in the cold.

3. Process according to claim 2 in which the organic diluent is a lower fatty acid.

4. Process according to claim 1 in which the compound having an ortho-toluenesulphonamide group is ortho-toluenesulphonamide and the ortho-sulphobenzimide compound is saccharin.

5. Process according to claim 1 in which the reaction medium contains an oxidation initiator.

6. Process according to claim 1 in which the oxidation is carried out in a mixture of water and a liquid organic diluent which is an inert solvent under the reaction conditions but in which the ortho-sulphobenzimide compound is substantially completely insoluble in the cold, the weight of water being up to 8 percent of the weight of the organic diluent.

7. Process according to claim 1 in which o-toluenesulphonamide is oxidised with air in acetic acid containing 1 – 6 percent by weight water in the presence of a manganese bromide or cobalt acetate catalyst and saccharin is recovered.

8. Process according to claim 7 in which the oxidation is initiated by acetaldehyde or methyl ethyl ketone.

* * * * *